United States Patent
Farris

(10) Patent No.: US 9,979,818 B2
(45) Date of Patent: May 22, 2018

(54) CALLER ID VERIFICATION

(71) Applicant: Verizon Patent and Licensing Inc., Basking Ridge, NJ (US)

(72) Inventor: Jack M. Farris, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 308 days.

(21) Appl. No.: 13/960,340

(22) Filed: Aug. 6, 2013

(65) Prior Publication Data

US 2015/0043724 A1 Feb. 12, 2015

(51) Int. Cl.
*H04M 3/42* (2006.01)
*H04M 3/436* (2006.01)

(52) U.S. Cl.
CPC ..... *H04M 3/4365* (2013.01); *H04M 3/42059* (2013.01)

(58) Field of Classification Search
CPC .................. H04M 3/42059; H04M 3/4365
USPC ..................... 455/415; 379/142.05
See application file for complete search history.

(56) References Cited

U.S. PATENT DOCUMENTS

| | | | | |
|---|---|---|---|---|
| 6,487,600 B1 * | 11/2002 | Lynch | ............ | H04L 29/06 709/204 |
| 6,493,443 B1 * | 12/2002 | Furman | ............ | H04M 3/424 379/127.01 |
| 8,135,119 B1 * | 3/2012 | Zhao | ............ | H04M 1/57 370/352 |
| 8,315,595 B2 * | 11/2012 | Murphy | ............ | H04L 63/12 455/410 |
| 8,406,223 B2 * | 3/2013 | Battistello | ............ | H04L 65/1009 370/352 |
| 8,457,600 B2 * | 6/2013 | Liu | ............ | H04L 63/126 379/88.02 |
| 9,521,251 B2 * | 12/2016 | Liu | ............ | H04M 3/42042 |
| 2006/0036727 A1 * | 2/2006 | Kurapati | ............ | H04L 63/1458 709/224 |
| 2008/0112551 A1 * | 5/2008 | Forbes | ............ | H04M 3/42042 379/142.1 |

(Continued)

FOREIGN PATENT DOCUMENTS

WO    WO 9524107 A1 *  9/1995   ............ H04W 12/06

OTHER PUBLICATIONS

O'Donnell, "Caller ID Spoofing", http://netsecurity.about.com/b/2012/03/11/caller-id-spoofing.htm, Mar. 11, 2012, 2 pages.

*Primary Examiner* — Charles Shedrick

(57) ABSTRACT

A device may receive first identification information associated with a sending device. The first identification information may be provided by a receiving device, and may be associated with a request to establish a connection between the sending device and the receiving device. The device may receive a request to verify the first identification information. The device may determine, based on the request, second identification information identifying the sending device. The second identification information may be provided by the sending device, and may be associated with the request to establish the connection between the sending device and the receiving device. The device may compare the second identification information and the first identification information. The device may provide verification information indicating a result of the comparison.

20 Claims, 11 Drawing Sheets

(56) References Cited

U.S. PATENT DOCUMENTS

| | | | | |
|---|---|---|---|---|
| 2008/0137828 | A1* | 6/2008 | Chmaytelli | H04L 63/101 379/142.01 |
| 2008/0146199 | A1* | 6/2008 | Horodezky | H04M 1/575 455/413 |
| 2008/0253376 | A1* | 10/2008 | Charzinski | H04L 51/12 370/395.2 |
| 2010/0135477 | A1* | 6/2010 | Chen | H04L 63/18 379/142.05 |
| 2010/0158233 | A1* | 6/2010 | Caceres | H04M 3/436 379/207.02 |
| 2011/0211572 | A1* | 9/2011 | Campion | H04L 12/66 370/352 |
| 2014/0119527 | A1* | 5/2014 | Cohen | H04M 3/4365 379/207.13 |
| 2014/0128047 | A1* | 5/2014 | Edwards | H04L 51/12 455/415 |
| 2015/0236857 | A1* | 8/2015 | Feltham | H04L 63/0414 380/270 |

* cited by examiner

| Request ID 510 | Sending Device ID 520 | Receiving Device ID 530 | Date 540 | Time 550 |
|---|---|---|---|---|
| 201957 | 111-555-0100 | 999-555-0199 | 06/10/13 | 15:31:00 |

CALLER ID VERIFICATION

BACKGROUND

A sending device (e.g., a device associated with a calling party) may attempt to establish a connection with a receiving device (e.g., a device associated with a called party). An identification service (e.g., a caller ID service) may allow identification information (e.g., a telephone number, a name etc.), associated with the sending device, to be received by the receiving device. The identification information may be displayed by the receiving device.

BRIEF DESCRIPTION OF THE DRAWINGS

FIG. 5 is a diagram of an example data structure that stores initial identification information;

DETAILED DESCRIPTION

The following detailed description of example implementations refers to the accompanying drawings. The same reference numbers in different drawings may identify the same or similar elements.

A sending device (e.g., a device associated with a calling party) may request to establish a connection (e.g., a telephone call, a video call, etc.) with a receiving device (e.g., a device associated with a called party) via a network. Information identifying the sending device (e.g., identification ("ID") information) may be included in the connection request. The receiving device may receive the connection request and the ID information, associated with the connection request, via the network. However, the ID information received by the receiving device may not correctly identify the sending device (e.g., the ID information may be falsified, spoofed, altered, etc.). For example, a user may spoof caller ID information using voice over Internet Protocol (VoIP), an Internet calling card service, open source telephone exchange software, or a number of other spoofing techniques. A bridge device may implement such spoofing techniques by calling a receiving device and providing the spoofed caller ID information to the receiving device, calling a sending device using the real caller ID information (e.g., the real phone number), and bridging the calls.

As such, a user of the receiving device may wish to verify that the ID information, received with the connection request, is valid (e.g., that the ID information correctly identifies the sending device). The receiving device may send the ID information to a verification device, associated with a service provider, and the verification device may determine whether the information received by the receiving device correctly identifies the sending device (e.g., correctly identifies the real caller ID information used by the sending device and/or the bridge device). Implementations described herein may allow a verification device to verify that the ID information, associated with a sending device and received by a receiving device, correctly identifies the sending device.

Figure 1:
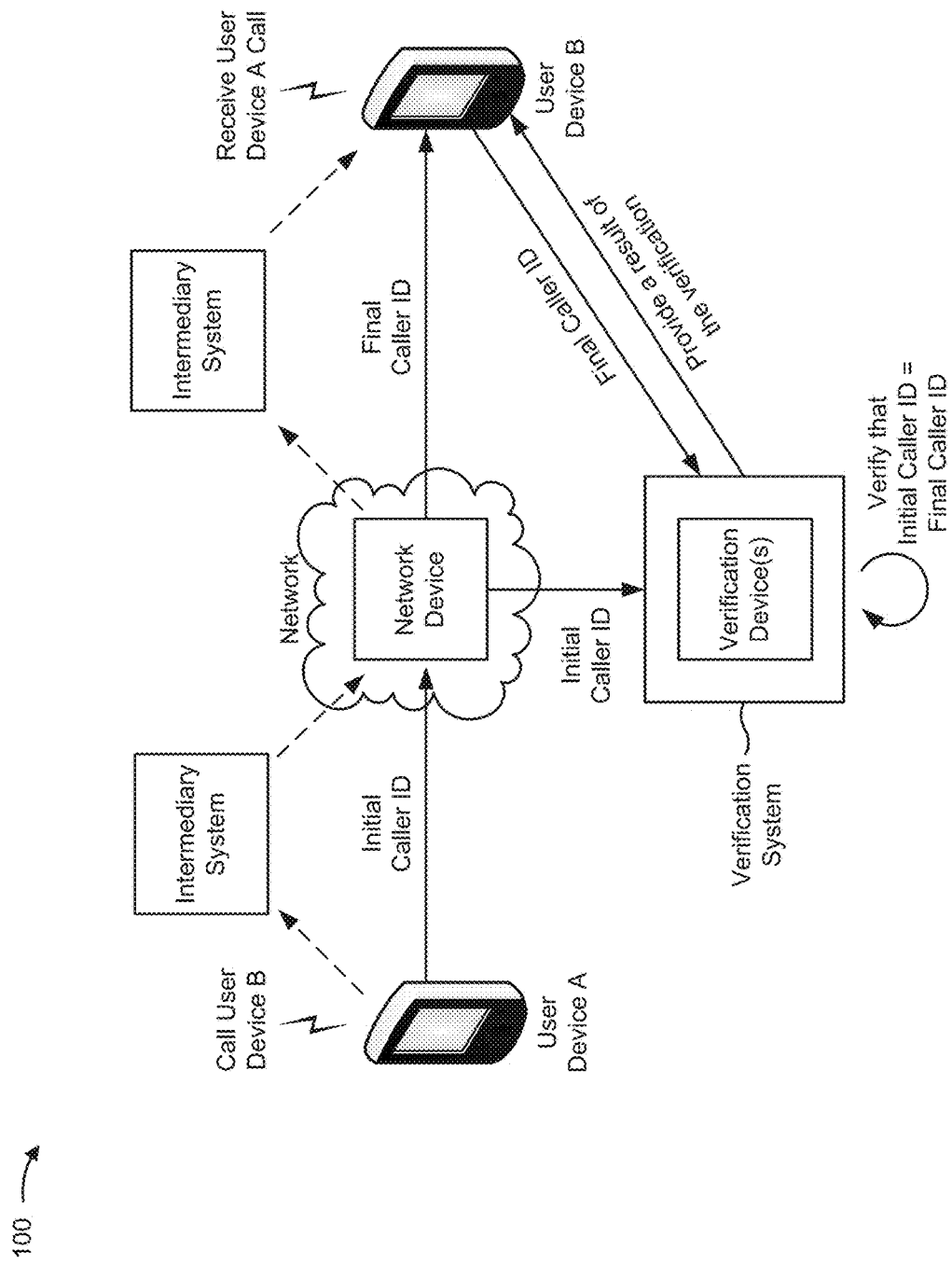
FIG. 1 is a diagram of an overview of an example implementation described herein.

FIG. 1 is a diagram of an overview of an example implementation 100 described herein. For the purposes of FIG. 1, assume that user device A is attempting to establish a connection (e.g., for a voice call, a video call, etc.) with user device B via a network.

As shown in FIG. 1, user device A may send initial caller ID information (e.g., information identifying user device A that is sent by user device A) to a network device (e.g., an end office switch, a softswitch, etc.) associated with the network. In some implementations, an intermediary system (e.g., a proxy device, a gateway, a session border controller, a telephone exchange, a private branch exchange (PBX), an automated call distributor, etc.) may assist in sending the initial caller ID information to the network device. As shown, the network device may send the initial caller ID information to a verification system that includes one or more verification devices associated with the service provider network, and the verification system may store the initial ID information.

As further shown in FIG. 1, user device B may receive (e.g., via the network and/or via an intermediary system) the request to establish a connection with user device A. The connection request may also include final caller ID information. As shown, user device B may send the final caller ID information to the verification system, and the verification system may determine whether the final caller ID information (e.g., the information received by user device B) matches the initial caller ID information (e.g., the information sent by user device A). The verification system may determine that the final caller ID information does (or does not) match the initial caller ID information, and may provide a result of the verification to user device B, accordingly. In this way, a user of a receiving device may be provided with information indicating whether final ID information, received by a receiving device, correctly identifies a sending device (e.g., the user may know whether the ID information has been falsified, spoofed, altered, etc.).

Figure 2:
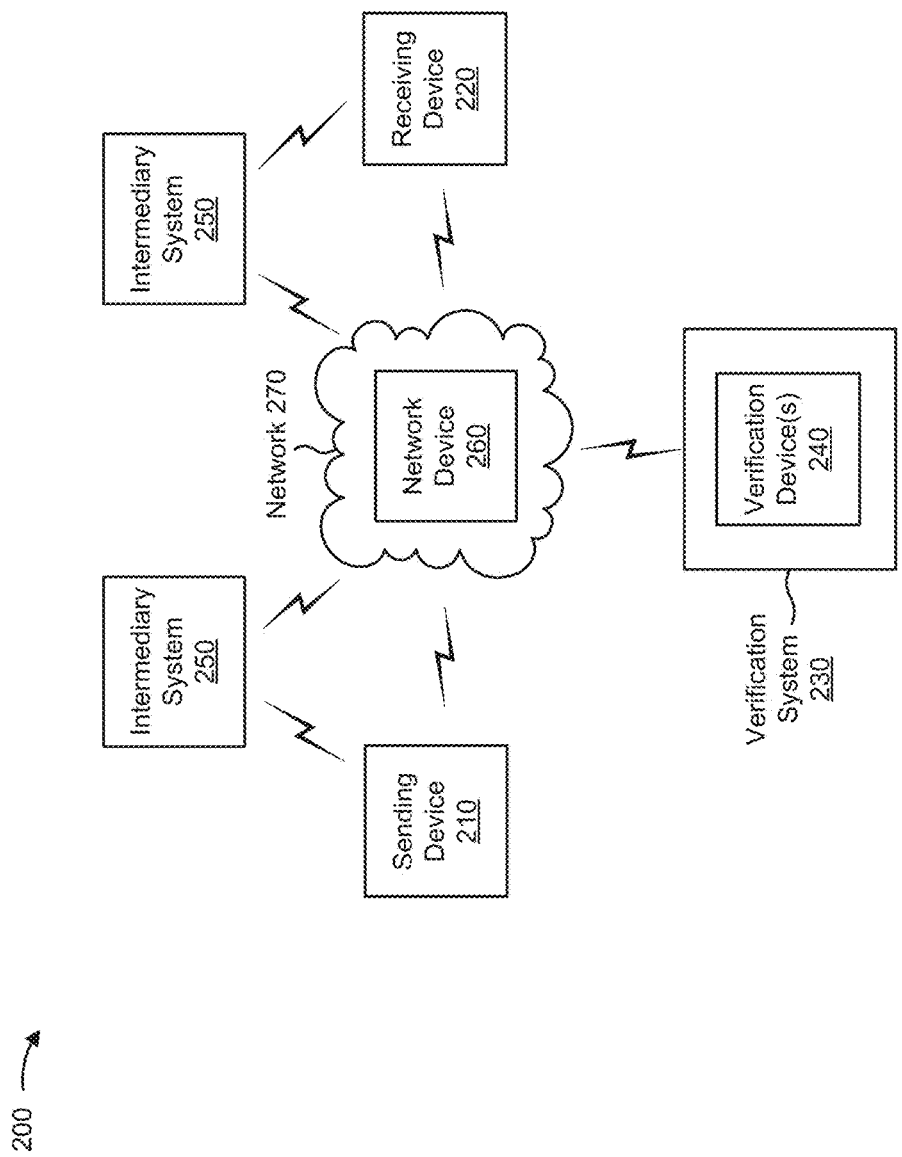
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a sending device 210, a receiving device 220, a verification system 230, one or more verification devices 240, one or more intermediary systems 250, a network device 260, and a network 270.

Sending device 210 may include one or more devices capable of communicating with another device via network 270. For example, sending device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or a similar device. In some implementations, sending device 210 may include a device capable of communicating with receiving device 220 (e.g., on a voice call, on a video call, etc.) via network 270. In some implementations, sending device 210 may store and/or transmit identification information associated with sending device 210.

Receiving device 220 may include one or more devices capable of communicating with another device via network 270. For example, receiving device 220 may include a wired communication device, a wireless communication device, a radiotelephone, a PCS terminal, a PDA, a smart phone, a desktop computer, a laptop computer, a tablet computer, and/or a similar device. In some implementations, receiving device 220 may include a device capable of communicating with sending device 210 (e.g., on a voice call, on a video call, etc.) via network 270. In some implementations, receiving device 220 may send and/or receive final ID information included in a request to establish a connection with another device (e.g., sending device 210).

Verification system 230 may include one or more verification devices 240 (e.g., a single verification device, multiple verification devices interconnected via a network, etc.). Verification device 240 may include one or more devices capable of receiving, generating, processing, storing, and/or providing ID information (e.g., caller ID information associated with sending device 210 and/or receiving device 220). For example, verification device 240 may include a server or a collection of servers. In some implementations, verification device 240 may receive, from sending device 210 and/or network device 260, initial ID information, and may determine whether final ID information, received by receiving device 220 and sent to verification device 240, matches the initial ID information. In some implementations, verification device 240 may include a device capable of communicating with one or more devices associated with network 270 (e.g., network device 260, etc.). In some implementations, verification device 240 may be included in network 270. While FIG. 2 shows verification system 230 as including a single verification device 240, in practice, verification system 230 may include multiple verification devices 240.

Intermediary system 250 may include one or more devices capable of providing an interface between networks. For example, intermediary system 250 may include a proxy device, a gateway, a switch, a hub, a router, a bridge, a session border controller, a telephone exchange, a private branch exchange (PBX), an automated call distributor, or a similar device. In some implementations, intermediary system 250 may assist in connected sending device 210 and/or receiving device 220 to network 270 (e.g., via an intermediary network, such as an enterprise network, a customer premises, a third-party network, etc.).

Network device 260 may include one or more devices device capable of receiving, generating, processing, storing, and/or providing information (e.g., ID information, information associated with a connection request, etc.) associated with sending device 210 and/or receiving device 220. For example, network device 260 may include a traffic transfer device, such as a server, a gateway, a router, a modem, a switch, a firewall, a network interface card ("NIC"), a hub, a bridge, an optical add/drop multiplexer ("OADM"), an end office switch, a softswitch, or the like. In some implementations, network device 260 may assist in establishing a connection between sending device 210 and receiving device 220 (e.g., an end office switch, a softswitch, a signaling system 7 ("SS7") class 4 switch, an SS7 class 5 switch, etc.). In some implementations, network device 260 may generate and/or transmit ID information using a particular protocol (e.g., SS7, SS7 utilizing an Advanced Intelligent Network (AIN), session initiation protocol (SIP), etc.). In some implementations, one or more network devices 240 may send/and or receive ID information (e.g., while a connection request passes through network 270). In some implementations, one or more network devices 240 may be included in network 270.

Network 270 may include one or more wired and/or wireless networks. For example, network 270 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 270 may allow sending device 210 to communicate with another device (e.g., receiving device 220, verification system 230, verification device 240, network device 260, etc.). In some implementations, network 270 may include verification system 230 and/or network device 260. While FIG. 2 shows network 270 as including a single network device 260, in practice, network 270 may include multiple network devices 240. For example, sending device 210 may communicate with a first network device 260, receiving device 220 may communicate with a second network device 260, and the first network device 260 may communicate with the second network device 260 via one or more other network devices 240.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
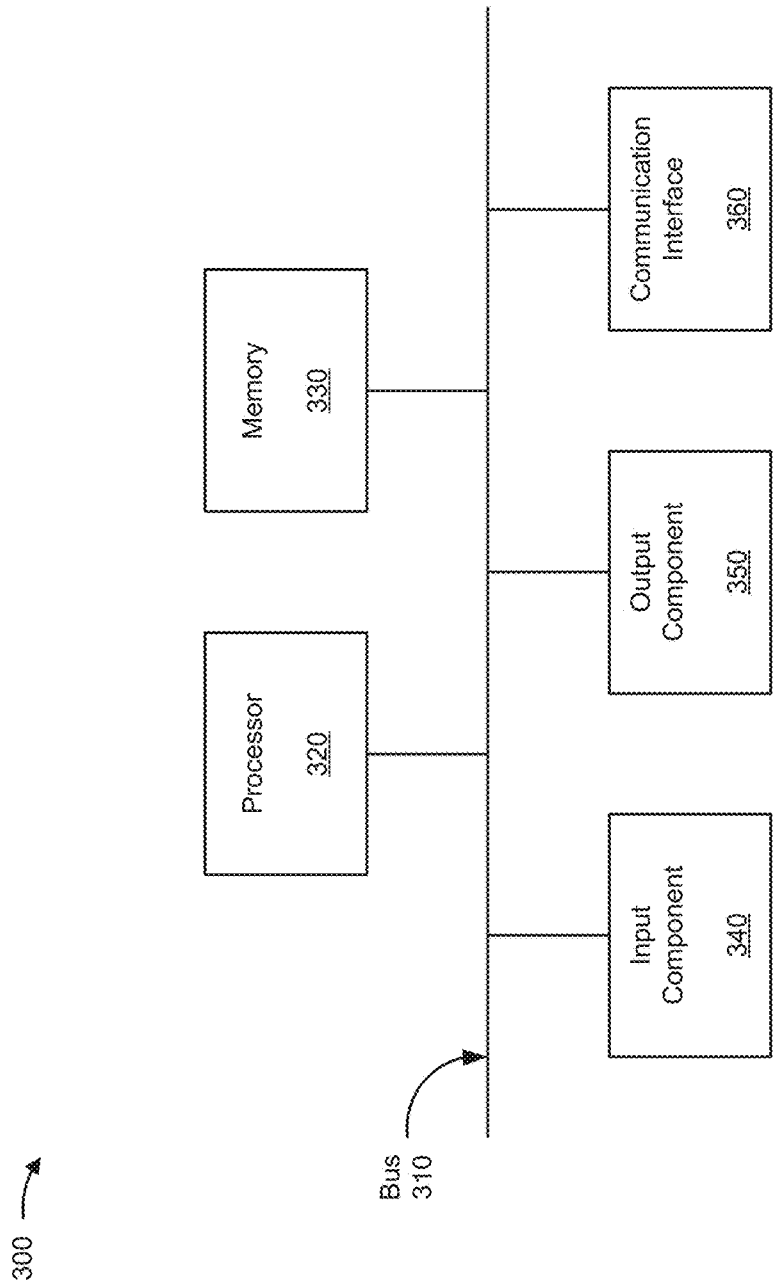
FIG. 3 is a diagram of example components of one or more devices of FIG. 2.

FIG. 3 is a diagram of example components of a device 300. Device 300 may correspond to sending device 210, receiving device 220, verification system 230, verification device 240, and/or network device 260. Additionally, or alternatively, each of sending device 210, receiving device 220, verification system 230, verification device 240, and/or network device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
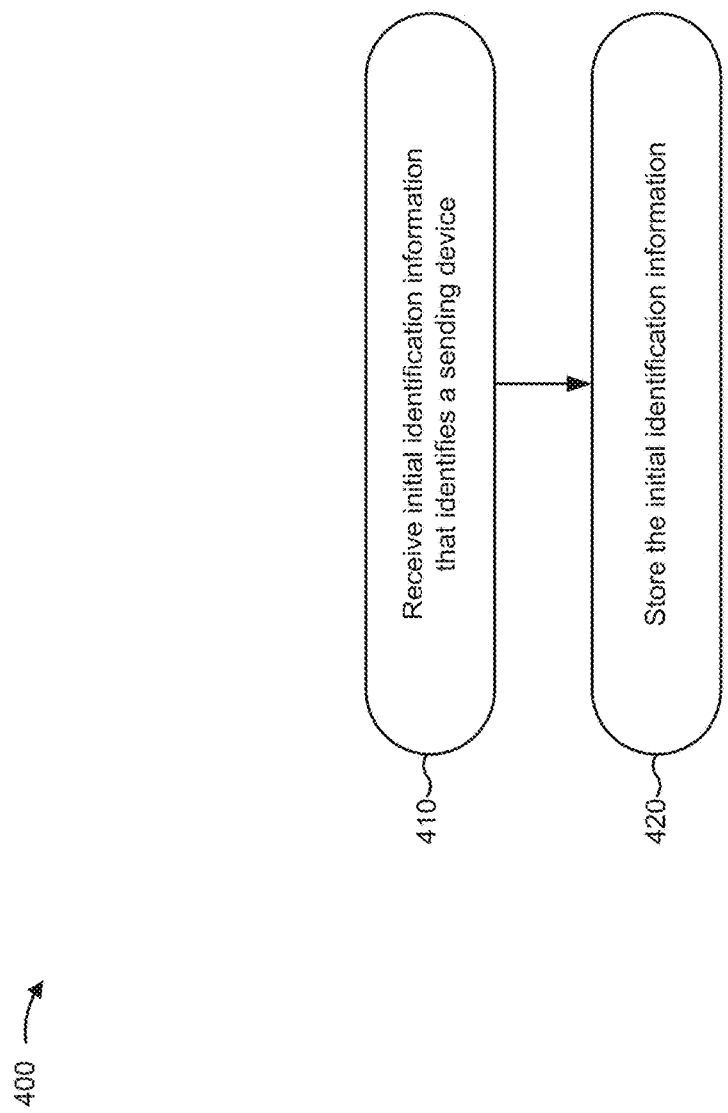
FIG. 4 is a flow chart of an example process for receiving and storing initial identification information that identifies a sending device associated with a connection request.

FIG. 4 is a flow chart of an example process 400 for receiving and storing initial identification information that identifies a sending device associated with a connection request. In some implementations, one or more process blocks of FIG. 4 may be performed by verification system 230. In some implementations, one or more process blocks of FIG. 4 may be performed by another device or a group of devices separate from or including verification system 230, such as sending device 210, receiving device 220, and/or network device 260.

As shown in FIG. 4, process 400 may include receiving initial identification information that identifies a sending device (block 410). For example, verification system 230 may receive initial ID information that identifies sending device 210. In some implementations, verification system 230 may receive the initial ID information from network device 260 and/or sending device 210. Additionally, or alternatively, verification system 230 may receive the initial ID information from another device associated with network 270.

In some implementations, verification system 230 may receive the initial ID information from network device 260 after network device 260 receives, from sending device 210, a request to establish a connection with receiving device 220. In some implementations, the initial ID information may be included in the request to establish the connection with receiving device 220, and network device 260 may forward the initial ID information to verification system 230. In some implementations, verification system 230 may receive the initial ID information from network device 260 after network device 260 determines the initial ID information based on receiving the connection request from sending device 210.

Initial ID information, as used herein, may include information, provided by sending device 210 and/or determined by network device 260, associated with a request to establish a connection between sending device 210 and receiving device 220. For example, the initial ID information may include information associated with a connection request (e.g., a string of characters that identifies the connection request, etc.). Additionally, or alternatively, the initial ID information may include a device identifier associated with sending device 210 (e.g., a string of characters that identifies sending device 210, an international mobile subscriber identity ("IMSI"), a mobile subscriber integrated services digital network number ("MSISDN"), a mobile directory number ("MDN"), a telephone number, etc.). Additionally, or alternatively, the initial ID information may include information associated with a user of sending device 210 (e.g., a user name, a user account number, etc.). Additionally, or alternatively, the initial ID information may include a device identifier associated with receiving device 220 (e.g., a string of characters that identifies receiving device 220, an IMSI, an MSISDN, an MDN, a telephone number, etc.).

In some implementations, the initial ID information may include information associated with a time (e.g., a time of day, a date, etc.) that the connection request is sent by sending device 210, and/or received by network device 260. Additionally, or alternatively, the initial ID information may include information associated with a service provider associated with sending device 210 and/or receiving device 220 (e.g., a service provider that provides service to sending device 210, a service provider that provides service to receiving device 220, etc.), or the like. Additionally, or alternatively, the initial ID information may include information associated with a time (e.g., a time of day, a date, etc.) that the initial ID information is received and/or stored by verification system 230.

In some implementations, network device 260 may determine the initial ID information based on a unique identifier associated with sending device 210 (e.g., a use of a particular switch port, an internet protocol ("IP") address, an electronic serial number, a mobile equipment identifier number, etc.). For example, sending device 210 may send a connection request to network device 260, and network device 260 may determine the initial ID information based on receiving the request via a particular switch port (e.g., dedicated to sending device 210). In some implementations, the initial ID information may be determined by network device 260 before the request to establish the connection with receiving device 240 passes through network 270.

As further shown in FIG. 4, process 400 may include storing the initial identification information (block 420). For example, verification system 230 may store the initial ID information in a data structure. In some implementations, verification system 230 may store information associated with the initial ID information, such as a user device identifier (e.g., a string of characters, an IMSI, an MSISDN, an MDN, etc.) that identifies a sending device 210 associated with the initial ID information. In some implementations, verification system 230 may store the initial ID information in a memory location (e.g., a RAM, a hard disk, etc.) of verification system 230, and verification system 230 may store an indication that the initial ID information is associated with sending device 210 and/or network device 260. Additionally, or alternatively, verification system 230 may transmit the initial ID information to another device (e.g., a device associated with network 270, etc.) for storage.

Verification system 230 may delete (e.g., remove from memory) stored initial ID information, in some implementations. For example, verification system 230 may delete stored initial ID information after a particular period of time has passed (e.g., a timeout period) since the initial ID information was received and/or stored by verification system 230. Additionally, or alternatively, verification system 230 may delete stored initial ID information based on receiving an instruction to delete the stored initial ID information. For example, verification system 230 may receive the instruction from a user and/or another device (e.g., network device 260), and may delete the stored initial ID information based on receiving the instruction. In some implementations, network device 260 may send an indicator that a call has ended and/or failed (e.g., a call between sending device 210 and receiving device 220), and verification device 240 may delete the stored initial ID information based on receiving the indicator. The indicator may include, for example, a request ID, a sending device ID, a receiving device ID, or the like, that permits verification system 230 to identify the stored initial ID information to be deleted.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel. Further, one or more blocks of process 400 may be omitted in some implementations.

FIG. 5 is a diagram of an example data structure 500 that stores initial identification information associated with a sending device. Data structure 500 may be stored in a memory device (e.g., a RAM, a hard disk, etc.) associated with one or more devices and/or components of FIG. 2 and/or FIG. 3. For example, data structure 500 may be stored by verification system 230, verification device 240, sending device 210, receiving device 220, and/or network device 260.

As shown in FIG. 5, data structure 500 may include a collection of fields, such as a request identifier field 510, a sending device identifier field 520, a receiving device identifier field 530, a date field 540, and a time field 550.

Request identifier field 510 may store information that identifies a request to establish a connection between sending device 210 and receiving device 220. For example, request identifier field may store a string of characters that identifies a connection and or a connection request (e.g., a request number, a request name, etc.). In some implementations, the information stored in request identifier field 510 may be provided by sending device 210 (e.g., when sending device 210 sends the connection request), network device 260 (when network device 260 receives the connection request), and/or verification system 230 (e.g., when verification system 230 receives the initial ID information).

Sending device identifier field 520 may store information that identifies sending device 210 associated with the connection request identified in request identifier field 510. For example, sending device identifier field 520 may store information identifying sending device 210 using a string of characters, a telephone number (e.g., 111-555-0100), an IP address, an IMSI, an MSISDN, an MDN, or the like.

Receiving device identifier field 530 may store information that identifies receiving device 220 associated with the connection request identified in request identifier field 510. For example, receiving device identifier field 530 may store information identifying receiving device 220 using a string of characters, a telephone number (e.g., 999-555-0199), an IP address, an IMSI, an MSISDN, an MDN, or the like.

Date field 540 may store information that identifies a date associated with the connection request identified in request identifier field 510. For example, date field 540 may include a string of characters identifying a date (e.g., 06/10/13) that the connection request was sent by sending device 210 identified in sending device identifier field 520.

Time field 550 may store information that identifies a time associated with the connection request identified in request identifier field 510. For example, time field 550 may include a string of characters identifying a time (e.g., 15:31:00) that the connection request was sent by sending device 210 identified in sending device identifier field 520.

Initial ID information associated with a connection request may be conceptually represented as a single row in data structure 500. For example, the first row of data structure 500 may correspond to a request, identified as 201957, that may be sent by a sending device 210 identified by the telephone number 111-555-0100. The request may indicate that the sending device is attempting to establish a connection with a receiving device 220 identified by the telephone number 999-555-0199. As further shown, the connection request may be sent by sending device 210 on Jun. 10, 2013 (e.g., 06/10/13) at 3:31 p.m. (e.g., 15:31:00).

Data structure 500 includes fields 510-550 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6:
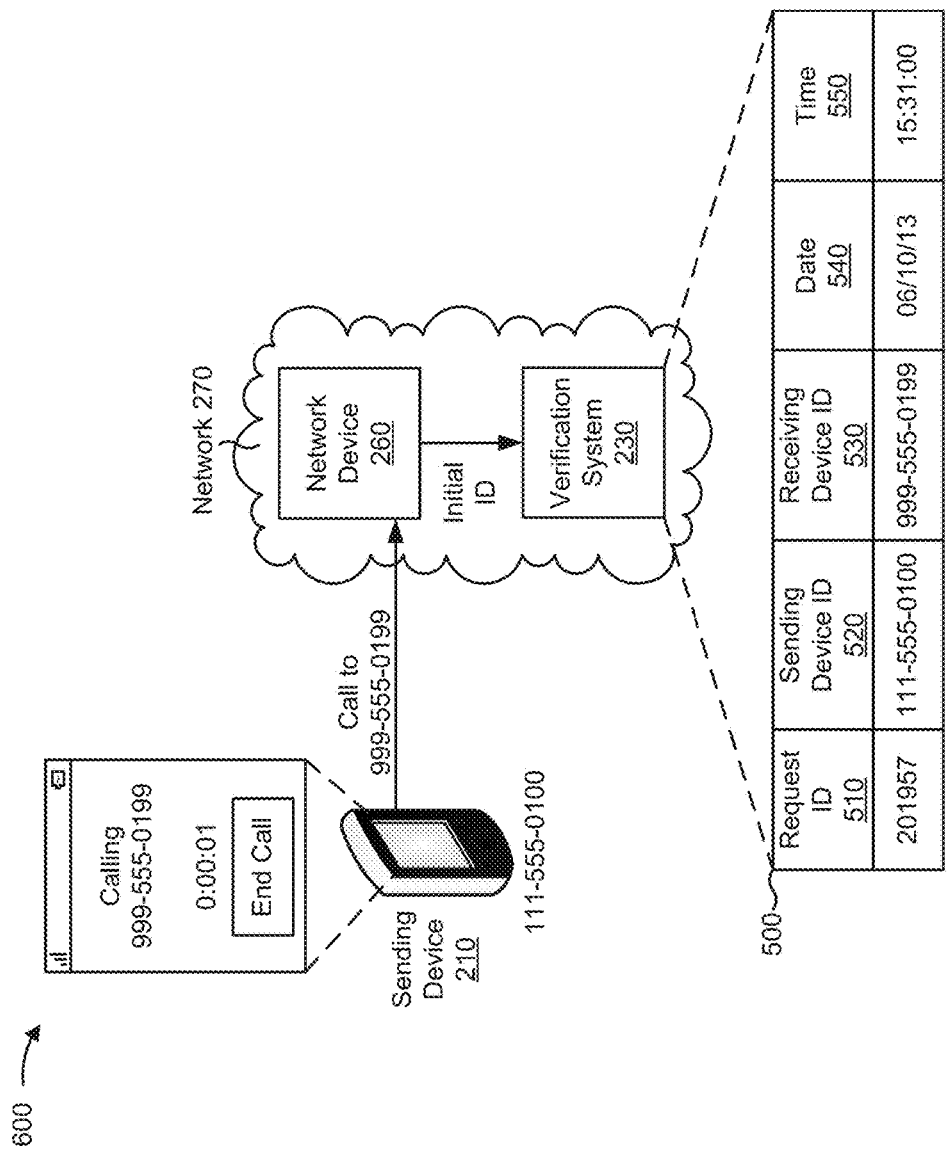
FIG. 6 is a diagram of an example implementation relating to the example process shown in FIG. 4.

FIG. 6 is a diagram of an example implementation 600 relating to example process 400 shown in FIG. 4. For the purposes of example implementation 600, assume that a user of sending device 210, associated with telephone number 111-555-0100, wishes to establish a connection with receiving device 220, associated with telephone number 999-555-0199.

As shown in FIG. 6, the user of sending device 210 may enter the telephone number of receiving device 220, and sending device 210 may send a request to establish a connection with receiving device 220 to network device 260. As shown, network device 260 may receive the connection request. Network device 260 may determine initial ID information associated with the connection request based on a unique identifier (e.g., 111-555-0100) associated with sending device 210, a receiving device identifier associated with the connection request, a date associated with the connection request, and a time associated with the connection request. As shown, network device 260 may forward initial ID information, associated with the connection request, to verification system 230.

As further shown in FIG. 6, verification system 230 may receive, from network device 260, the initial ID information (e.g., the request identifier, the sending device identifier, the receiving device identifier, the date, and the time) associated with the connection request. As shown, verification system 230 may store (e.g., in data structure 500) the initial ID information in a memory location associated with verification system 230.

As indicated above, FIG. 6 is provided merely as an example. Other examples are possible and may differ from what was described with regard to FIG. 6.

Figure 7:
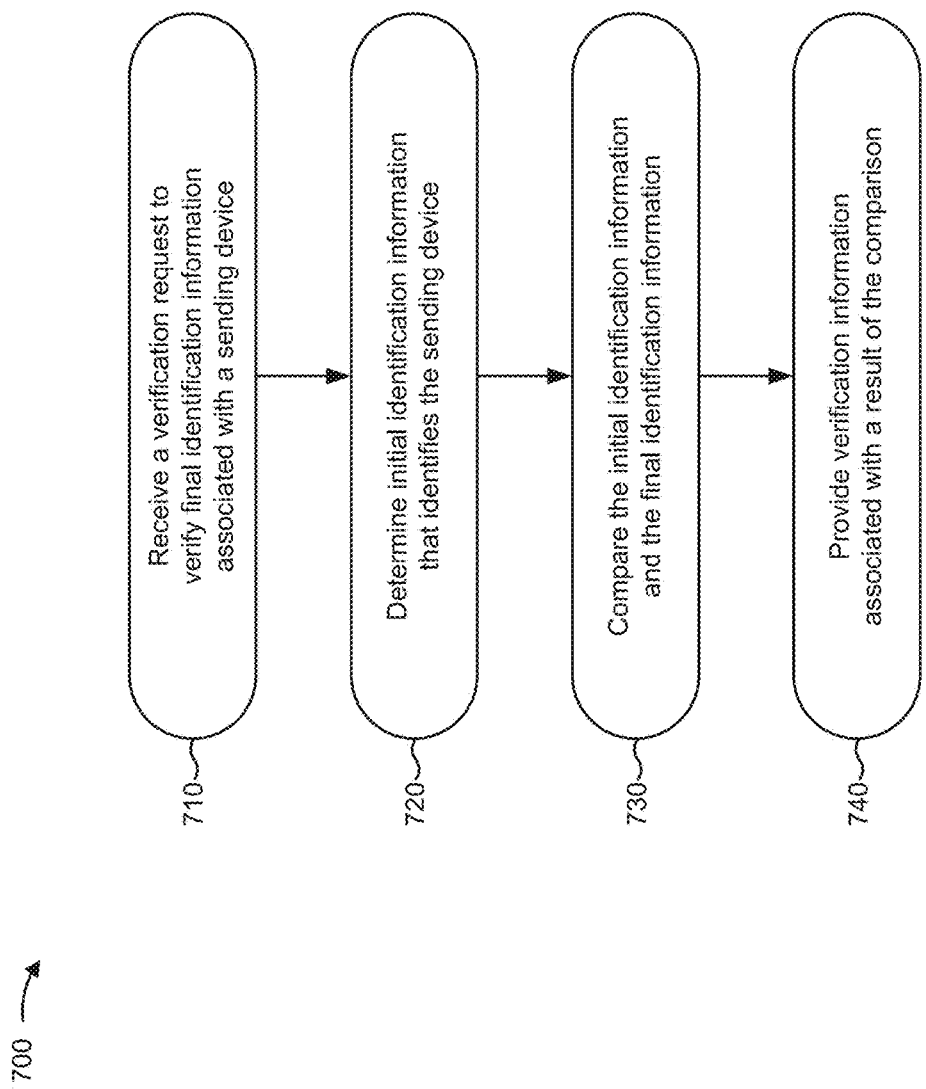
FIG. 7 is a flow chart of an example process for receiving a connection request to verify identification information associated with a sending device.

FIG. 7 is a flow chart of an example process 700 for verifying identification information associated with a sending device. In some implementations, one or more process blocks of FIG. 7 may be performed by verification system 230. In some implementations, one or more process blocks of FIG. 7 may be performed by another device or a group of devices separate from or including verification system 230, such as sending device 210, receiving device 220, and/or network device 260.

As shown in FIG. 7, process 700 may include receiving a request to verify final identification information associated with a sending device (block 710). For example, verification system 230 may receive, from receiving device 220, a request to verify final ID information. In some implementations, receiving device 220 may send the verification request to verification system 230 when receiving device 220 receives (e.g., from network device 260) a connection request, associated with sending device 210, that includes the final ID information. In some implementations, verification system 230 may receive the verification request from network device 260 and/or another device associated with network 270. In some implementations, receiving device 220 may send the final ID information (e.g., via network device 260 and/or network 270) to verification system 230.

Final ID information, as used herein, may include information, received by receiving device 220, associated with a request to establish a connection between sending device 210 and receiving device 220. For example, the final ID information may include information associated with the connection request (e.g., a string of characters that identifies the connection request, etc.). Additionally, or alternatively, the final ID information may include a device identifier associated with sending device 210 and/or receiving device 220 (e.g., a string of characters, an IMSI, an MSISDN, an MDN, a telephone number etc.).

In some implementations, the final ID information may include information associated with a time (e.g., a time of day, a date, etc.) that the connection request is sent by sending device 210, and/or received by network device 260. Additionally, or alternatively, the final ID information may include information associated with a service provider associated with sending device 210 and/or receiving device 220 (e.g., a service provider that provides service to sending device 210, a service provider that provides service to receiving device 220, etc.), or the like. Additionally, or alternatively, the final ID information may include information associated with a time (e.g., a time of day, a date, etc.) that the final ID information is received and/or stored by verification system 230 and/or receiving device 220.

As further shown in FIG. 7, process 700 may include determining initial identification information that identifies the sending device (block 720). For example, verification system 230 may determine the initial ID information based on initial ID information, associated with the connection request, stored by verification system 230. In some implementations, the initial ID information may be included in data structure 500 stored by verification system 230 and/or another device (e.g., network device 260).

In some implementations, verification system 230 may determine the initial ID information based on the final ID information. For example, verification system 230 may receive final ID information associated with the connection request (e.g., a request identifier, a date, a time, etc.) and may determine the initial ID information based on the final ID information (e.g., the request identifier, the date, and/or the time included in the final ID information may match the request identifier, the date, and/or the time included in the initial ID information stored by verification system 230, etc.). Additionally, or alternatively, verification system 230 may receive final ID information identifying sending device 210 and/receiving device 220 (e.g., a telephone number, an IP address, a IMSI, an MSISDN, an MDN, etc.) and may determine the initial ID information based on the final ID information (e.g., the telephone number identifying sending device 210 and/or receiving device 220 included in the final ID information may match the telephone number identifying sending device 210 and/or receiving device 220 included in the initial ID information stored by verification system 230, etc.).

Additionally, or alternatively, verification system 230 may receive final ID information identifying a time associated with the connection request, and may determine the initial ID information based on the time identified by the final ID information. For example, verification system 230 may receive final ID information at a particular time, and verification system 230 may determine the initial ID information based on a time (e.g., a time that is within a threshold amount of time before the time that verification system 230 received the final ID information) identified by the initial ID information stored by verification system 230. In some implementations, the time identified in the final ID information (e.g., a time at which the final ID information was received by verification system 230) may be within a threshold time of the time identified in the initial ID information (e.g., a time at which the initial ID information was sent or determined).

In some implementations, verification system 230 may be unable to determine the initial ID information based on the final ID information (e.g., when the final ID information has been falsified, spoofed, altered, etc.), and verification system 230 may provide information to receiving device 220, as discussed below (e.g., information indicating that the final ID information could not be verified).

As further shown in FIG. 7, process 700 may include comparing the initial identification information and the final identification information (block 730). For example, verification system 230 may compare the initial ID information and the final ID information. In some implementations, verification system 230 may compare the initial ID information and the final ID information based on determining the initial ID information and/or receiving the final ID information.

In some implementations, verification system 230 may compare the initial ID information and the final ID information to determine whether the initial ID information matches the final ID information. For example, verification system 230 may determine whether a sending device identifier included in the initial ID information matches a sending device identifier included in the final ID information (e.g., verification system 230 may determine whether the sending device identifier included in the final ID information has been falsified, spoofed, altered, etc.). In some implementations, verification system 230 may determine whether other information included in the final ID information (e.g., a request number, a name associated with the sending device identifier, a date, a time, etc.) matches information included in the initial ID information. Additionally, or alternatively, verification system 230 may determine a name associated with the initial ID information (e.g., by accessing a caller ID name database), and may compare the name associated with the initial ID information to a name included in the final ID information.

As further shown in FIG. 7, process 700 may include providing verification information associated with a result of the comparison (block 740). For example, verification system 230 may provide verification information, associated with a result of comparing the initial ID information and the final ID information, to receiving device 220. Additionally, or alternatively, verification system 230 may provide the verification information to network device 260 and/or another device associated with network 270.

In some implementations, the verification information may indicate that the initial ID information matches the final ID information. For example, verification system 230 may determine that a sending device identifier (e.g., associated with sending device 220), included in the initial ID information, matches a sending device identifier included in the final ID information. In some implementations, verification system 230 may provide the verification information, indicating that the sending device identifiers match, to receiving device 220 and/or network device 260. In some implementations, receiving device 220 and/or network device 260 may establish a connection between sending device 210 and receiving device 220 based on the verification information indicating that the sending device identifiers match. In some implementations, receiving device 220 may prompt (e.g., via a display screen of receiving device 220) a user of receiving device 220 to indicate whether a connection with sending device 210 is to be established. In some implementations, network device 260 may provide verification information indicating that the initial ID information matches the final ID information. For example, network device 260 may determine that initial ID information matches final ID information, and may provide, to receiving device 220 and/or verification system 230, verification information indicating that the ID information has been verified (e.g., by adding "V" to the traditional ID information passed to receiving device 220 included in the connection request, etc.).

In some implementations, the verification information may indicate that the initial ID information does not match the final ID information. For example, verification system 230 may determine that the sending device identifier (e.g., associated with sending device 210), included in the initial ID information, does not match the sending device identifier included in the final ID information. In some implementations, verification system 230 may provide the verification information, indicating that the sending device identifiers do not match, to receiving device 220 and/or network device 260. In some implementations, receiving device 220 and/or network device 260 may not permit a connection to be established (e.g., may automatically reject the connection request) between sending device 210 and receiving device 220 based on the verification information indicating that the sending device identifiers do no match. In some implementations, receiving device 220 may prompt the user (e.g., via a display screen associated with receiving device 220) to indicate whether to establish a connection with sending device 210 based on the information indicating that the initial and final sending device identifiers do not match. Additionally, or alternatively, receiving device 220 may prompt the user to indicate whether to reject the connection request and attempt to contact sending device 210 using the final ID information received by receiving device 220 (e.g., receiving device may reject the connection request and call back the telephone number included in the final ID information).

In some implementations, the initial ID information may not match the final ID information, but the final ID information may correctly identify sending device 210. For example, the initial ID may identify a device associated with an entity (e.g., a telephone number associated with an extension telephone number of a company), and the final ID information may identify another device associated with the entity (e.g., a main telephone number of the company). In this case, verification system 230 may determine (e.g., based on information stored by verification system 230) that the final ID information correctly identifies sending device 210, and may provide an indication to receiving device 220, accordingly.

Although FIG. 7 shows example blocks of process 700, in some implementations, process 700 may include additional blocks, different blocks, fewer blocks, or differently arranged blocks than those depicted in FIG. 7. Additionally, or alternatively, one or more of the blocks of process 700 may be performed in parallel. Further, one or more blocks of process 700 may be omitted in some implementations.

Figure 8A:
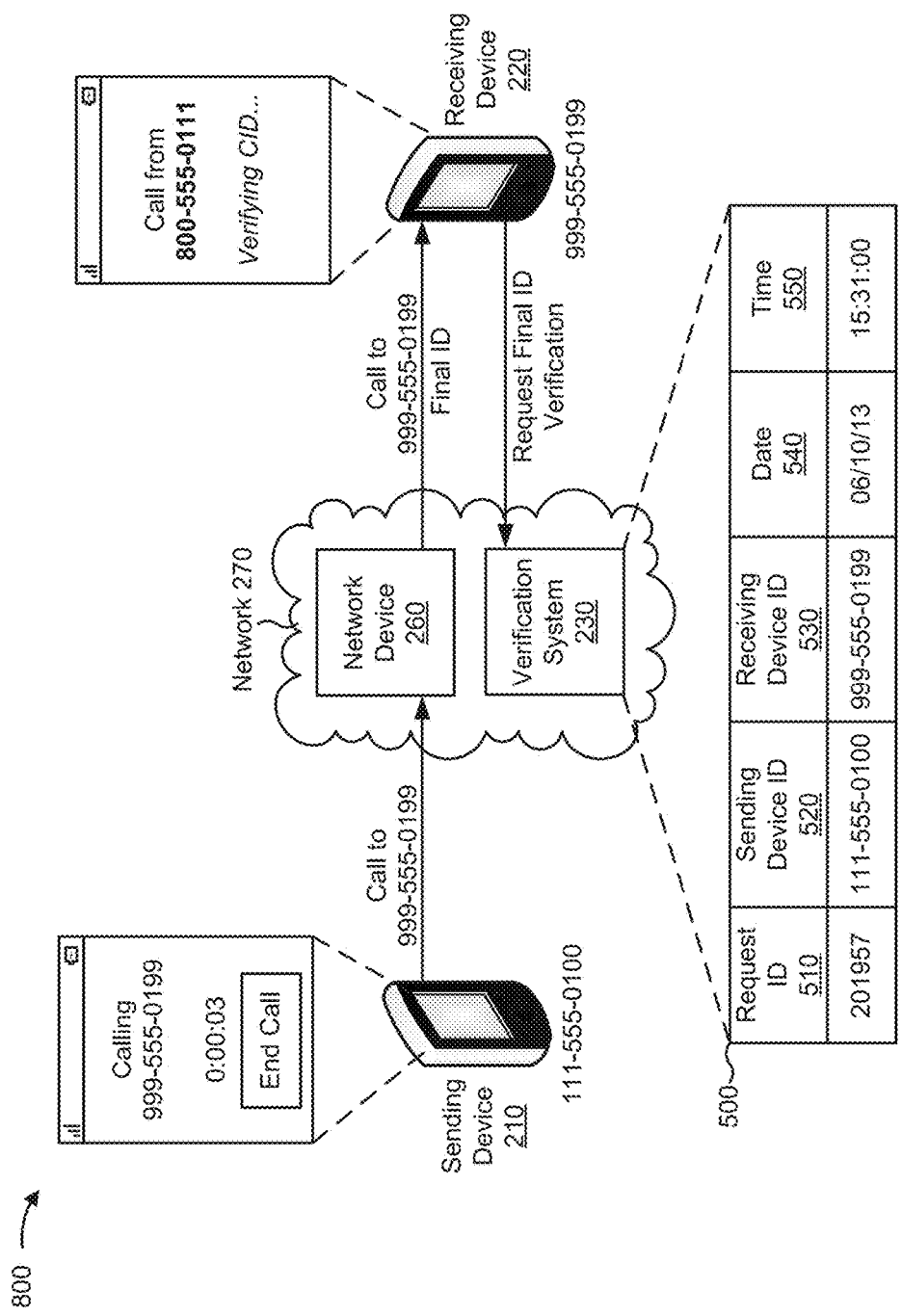
FIGS. 8A and 8B are diagrams of an example implementation relating to the example process shown in FIG. 7.
Figure 8B:
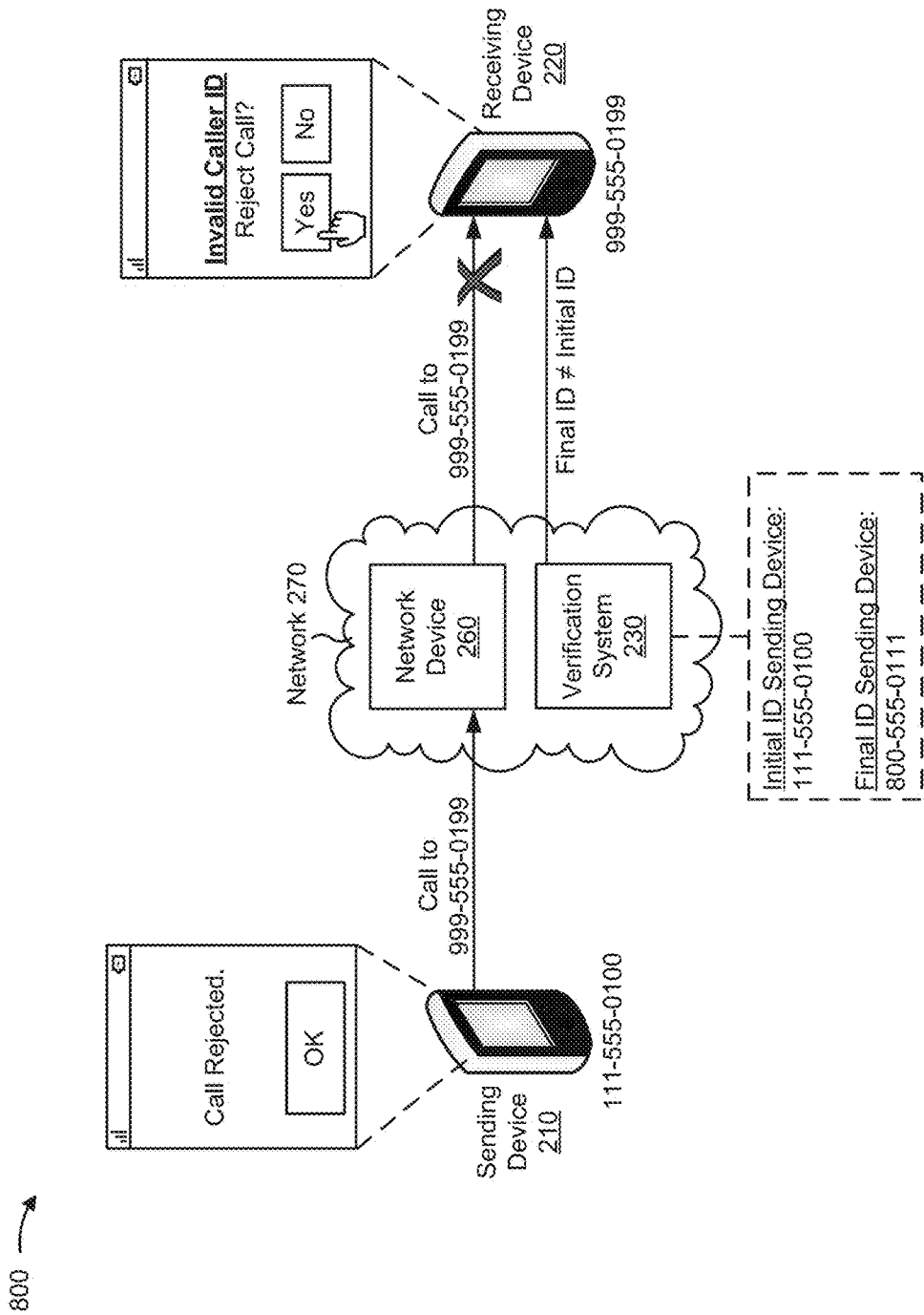

FIGS. 8A and 8B are diagrams of an example implementation 800 relating to example process 700 shown in FIG. 7. For the purposes of example implementation 800, assume that sending device 210, associated with sending device identifier of 111-555-0100, has requested to establish a connection with receiving device 220, associated with a receiving device identifier of 999-555-0199. Further, assume that initial ID information, associated with the connection request, was received (e.g., from network device 260) and stored by verification system 230 in data structure 500. Finally, assume that the connection request has passed through network 270 and/or one or more network devices 240.

As shown in FIG. 8A, the connection request may be received by receiving device 220, and the connection request may include final ID information associated with the connection request. As shown, the final ID information may include information indicating that the sending device identifier of sending device 210, attempting to establish a connection with receiving device 220, is 800-555-0111.

As further shown in FIG. 8A, receiving device 220 may send, to verification system 230, a request to verify the final ID information. As shown, the verification request may include the sending device identifier received by receiving device 220 (e.g., 800-555-0111). The verification request may also include a request identifier, a date, and a time, associated with the connection request, included in the final ID information. As shown, verification system 230 may determine initial ID information associated with the connection request (e.g., based on a request identifier, associated with the final ID information, that matches a request identifier, associated with the initial ID information). As further shown, verification system 230 may determine the sending device identifier included in the initial ID information is 111-555-0100.

As shown in FIG. 8B, verification system 230 may compare the sending device identifier included in the initial ID information and the sending device identifier included in the final ID information. As shown, verification system 230 may determine that the initial sending device identifier does not match the final sending device identifier. As further shown, verification system 230 may provide, to receiving device 220, information indicating that the initial sending device identifier does not match the final sending device identifier. As shown, receiving device 220 may notify (e.g., via a display screen associated with receiving device 220) a user of receiving device 220 that the initial sending device identifier does not match the final sending device identifier (e.g., "Invalid Caller ID"). As further shown, receiving device 220 may prompt the user (e.g., "Reject Call?") to indicate whether to reject the request to establish a connection with sending device 210, and the user may provide input indicating that the connection request is to be rejected (e.g., by clicking a "Yes" button).

As indicated above, FIGS. 8A and 8B are provided merely as an example. Other examples are possible and may differ from what was described with regard to FIGS. 8A and 8B.

Figure 9A:
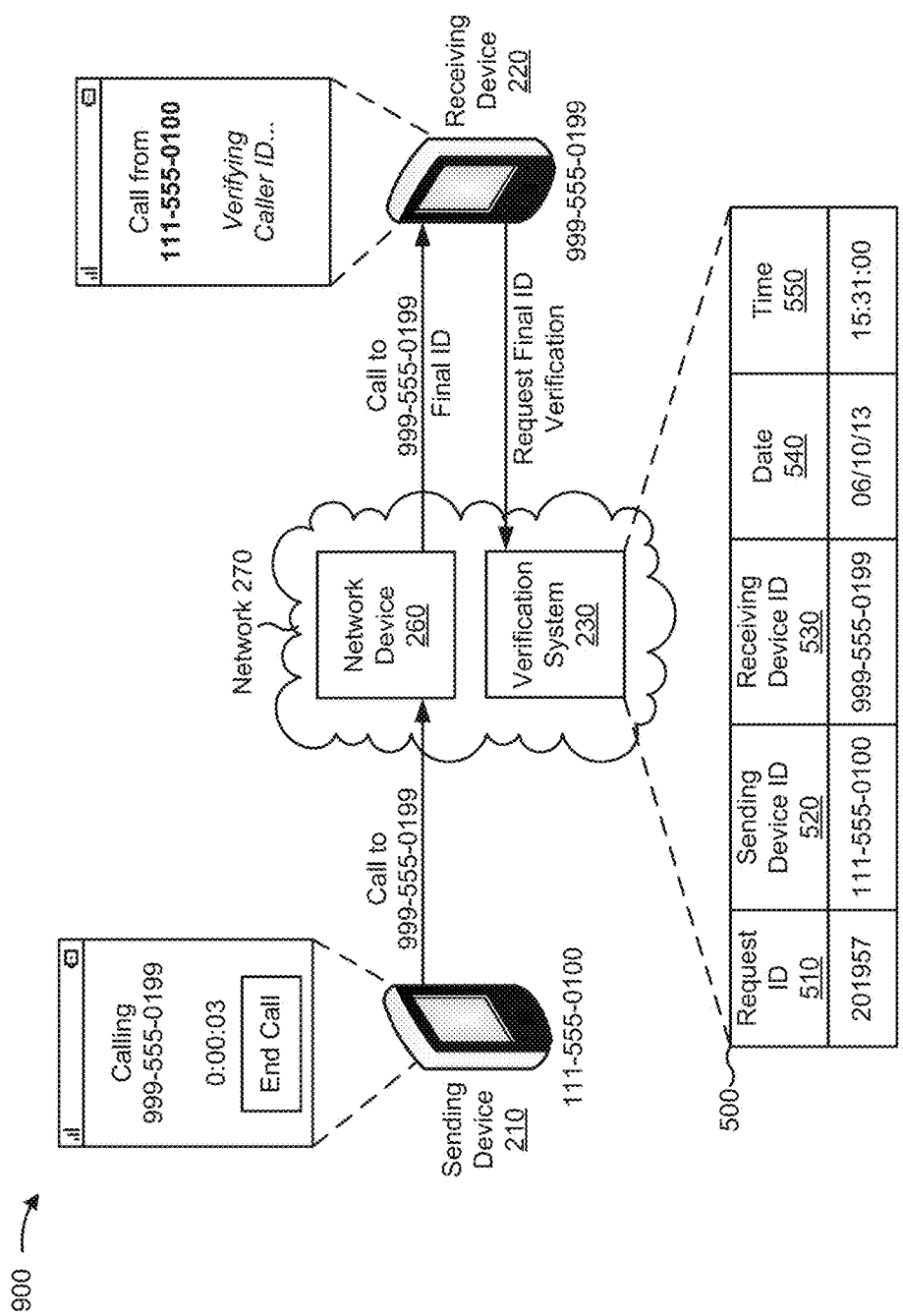
FIGS. 9A and 9B are diagrams of an additional example implementation relating to the example process shown in FIG. 7.
Figure 9B:
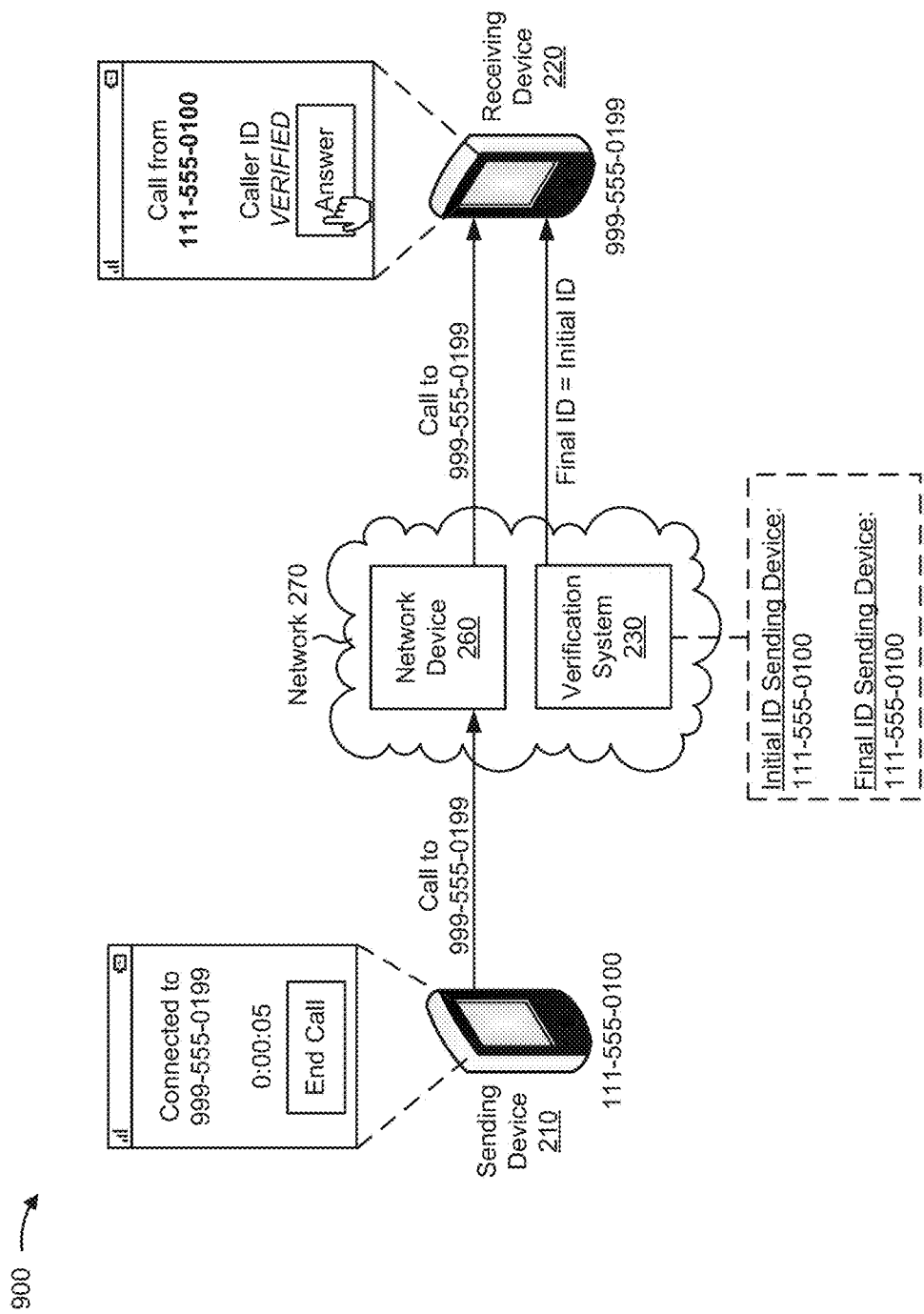

FIGS. 9A and 9B are diagrams of an additional example implementation 900 relating to example process 700 shown in FIG. 7. For the purposes of example implementation 900, assume that sending device 210, associated with sending device identifier of 111-555-0100, has requested to establish a connection with receiving device 220, associated with a receiving device identifier of 999-555-0199. Further, assume that initial ID information, associated with the connection request, was received (e.g., from network device 260) and stored by verification system 230 in data structure 500. Finally, assume that the connection request has passed through network 270 and/or one or more network devices 240.

As shown in FIG. 9A, the connection request may be received by receiving device 220, and the connection request may include final ID information associated with the connection request. As shown, the final ID information may include information indicating that the sending device identifier of sending device 210, attempting to establish a connection with receiving device 220, is 111-555-0100.

As further shown in FIG. 9A, receiving device 220 may send, to verification system 230, a verification request to verify the final ID information. As shown, the verification request may include the sending device identifier received by receiving device 220 (e.g., 111-555-0100). The verification request may also include a request identifier, a date, and a time, associated with the connection request, included in the final ID information. As shown, verification system 230 may determine initial ID information associated with the connection request (e.g., based on a request identifier, associated with the final ID information, that matches a request identifier, associated with the initial ID information). As further shown, verification system 230 may determine the sending device identifier included in the initial ID information is 111-555-0100.

As shown in FIG. 9B, verification system 230 may compare the sending device identifier included in the initial ID information and the sending device identifier included in the final ID information. As shown, verification system 230 may determine that the initial sending device identifier matches the final sending device identifier. As further shown, verification system 230 may provide, to receiving device 220, information indicating that the initial sending device identifier matches the final sending device identifier. As shown, receiving device 220 may notify (e.g., via a display screen associated with receiving device 220) a user of receiving device 220 that the initial sending device identifier matches the final sending device identifier (e.g., "Caller ID Verified"). As further shown, the user may provide input (e.g., by clicking an "Answer" button) indicating that the connection request is to be accepted, and the connection between sending device 210 and receiving device 220 may be established.

As indicated above, FIGS. 9A and 9B are provided merely as an example. Other examples are possible and may differ from what was described with regard to FIGS. 9A and 9B.

Implementations described herein may allow a verification device to verify that ID information, associated with a sending device and received by a receiving device, correctly identifies the sending device before a connection between the sending device and the receiving device is established.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a device or a user. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, from a network device, initial identification information that identifies a sending device after the sending device transmits a request to establish a connection between the sending device and a receiving device,
the network device, the sending device, and the receiving device being separate from the device,
the sending device and the receiving device being separate from the network device, and
the request to establish the connection being received by the network device from the sending device;
receive, from the receiving device, a verification request to verify whether final identification information, received for the sending device by the receiving device, correctly identifies the sending device,
the final identification information being received by the receiving device from the network device;
identify a time based on the verification request to verify whether the final identification information correctly identifies the sending device;
determine the initial identification information based on the time;
compare, after determining the initial identification information based on the time, the final identification information and the initial identification information; and
provide verification information indicating a result of comparing the final identification information and the initial identification information.

2. The device of claim 1, where the initial identification information or the final identification information additionally includes information identifying at least one of:
the request to establish the connection;
a date of the request; or
the receiving device.

3. The device of claim 1,
where the one or more processors are further to:
determine a sending device identifier included in the initial identification information; and
determine a sending device identifier included in the final identification information;
where the one or more processors, when comparing the final identification information and the initial identification information, are to:
compare the sending device identifier included in the final identification information and the sending device identifier included in the initial identification information; and
where the one or more processors, when providing the verification information indicating the result of comparing the final identification information and the initial identification information, are to:
provide the verification information based on comparing the sending device identifier included in the final identification information and the sending device identifier included in the initial identification information.

4. The device of claim 3,
where the one or more processors, when comparing the sending device identifier included in the final identification information and the sending device identifier included in the initial identification information, are to:
determine that the sending device identifier included in the final identification information matches the sending device identifier included in the initial identification information; and
where the verification information indicates that the sending device identifier included in the final identification information matches the sending device identifier included in the initial identification information.

5. The device of claim 3,
where the one or more processors, when comparing the sending device identifier included in the final identification information and the sending device identifier included in the initial identification information, are to:
determine that the sending device identifier included in the final identification information does not match the sending device identifier included in the initial identification information; and
where the verification information indicates that the sending device identifier included in the final identification information does not match the sending device identifier included in the initial identification information.

6. The device of claim 1,
where the one or more processors, when comparing the final identification information and the initial identification information, are to:
determine that the final identification information matches the initial identification information; and
where the one or more processors, when providing the verification information indicating the result of comparing the final identification information and the initial identification information, are to:
provide information indicating that the final identification information matches the initial identification information.

7. The device of claim 1,
where the one or more processors, when comparing the final identification information and the initial identification information, are to:
determine that the final identification information does not match the initial identification information; and
where the one or more processors, when providing the verification information indicating the result of comparing the final identification information and the initial identification information, are to:
provide information indicating that the final identification information does not match the initial identification information.

8. A non-transitory computer-readable medium storing instructions, the instructions comprising:

one or more instructions that, when executed by one or more processors, cause the one or more processors to:
receive, from a network device, initial identification information that identifies a sending device after the sending device transmits a request to establish a connection with a receiving device,
the network device, the sending device, and the receiving device being separate from the one or more processors,
the sending device and the receiving device being separate from the network device, and
the request to establish the connection being received by the network device from the sending device;
receive, from the receiving device, a verification request to determine whether final identification information correctly identifies the sending device,
the final identification information being received by the receiving device from the network device;
compare, after receiving the verification request, the initial identification information and the final identification information;
determine verification information indicating a result of comparing the initial identification information and the final identification information; and
provide the verification information.

9. The non-transitory computer-readable medium of claim 8, where the initial identification information or the final identification information includes information additionally identifying at least one of:
the request to establish the connection;
a date of the request; or
the receiving device.

10. The non-transitory computer-readable medium of claim 8,
where the one or more instructions, when executed by the one or more processors, further cause the one or more processors to:
determine a sending device identifier included in the initial identification information; and
determine a sending device identifier included in the final identification information;
where the one or more instructions, that cause the one or more processors to compare the initial identification information and the final identification information, cause the one or more processors to:
compare the sending device identifier included in the initial identification information and the sending device identifier included in the final identification information; and
where the one or more instructions, that cause the one or more processors to determine the verification information, cause the one or more processors to:
determine the verification information based on comparing the sending device identifier included in the initial identification information and the sending device identifier included in the final identification information.

11. The non-transitory computer-readable medium of claim 10, where the one or more instructions, that cause the one or more processors to determine the verification information, cause the one or more processors to:
determine the verification information indicating that the sending device identifier included in the initial identification information matches the sending device identifier included in the final identification information.

12. The non-transitory computer-readable medium of claim 10, where the one or more instructions, that cause the one or more processors to determine the verification information, cause the one or more processors to:
determine the verification information indicating that the sending device identifier included in the initial identification information does not match the sending device identifier included in the final identification information.

13. The non-transitory computer-readable medium of claim 8,
where the one or more instructions, that cause the one or more processors to compare the initial identification information and the final identification information, cause the one or more processors to:
determine that the initial identification information matches the final identification information; and
where the one or more instructions, that cause the one or more processors to determine the verification information, cause the one or more processors to:
determine the verification information indicating that the initial identification information matches the final identification information.

14. The non-transitory computer-readable medium of claim 8,
where the one or more instructions, that cause the one or more processors to compare the initial identification information and the final identification information, cause the one or more processors to:
determine that the initial identification information does not match the final identification information; and
where the one or more instructions, that cause the one or more processors to determine the verification information, cause the one or more processors to:
determine the verification information indicating that the initial identification information does not match the final identification information.

15. The non-transitory computer-readable medium of claim 8, where the one or more instructions, that cause the one or more processors to provide the verification information, cause the one or more processors to:
provide the verification information to the receiving device.

16. A method, comprising:
receiving, by a device and from a network device, initial identification information that includes a first sending device identifier of a sending device after the sending device sends a connection request to establish a connection with a receiving device,
the network device, the sending device, and the receiving device being separate from the device,
the sending device and the receiving device being separate from the network device, and
the connection request being received by the network device from the sending device;
receiving, by the device, a verification request to verify whether final identification information includes a second sending device identifier that correctly identifies the sending device,
the final identification information being received by the receiving device from the network device;
comparing, by the device and based on receiving the verification request, the initial identification information and the final identification information; and
transmitting, by the device, verification information indicating a result of comparing the initial identification information and the final identification information.

17. The method of claim 16, further comprising:
storing the initial identification information; and
where determining the initial identification information comprises:
determining the initial identification information after storing the initial identification information.

18. The method of claim 16, where the initial identification information or the final identification information further includes information identifying at least one of:
a date of the connection request; or
the receiving device.

19. The method of claim 16,
where comparing the initial identification information and the final identification information further comprises:
determining that the initial identification information matches the final identification information; and
where the verification information indicates that the initial identification information matches the final identification information.

20. The method of claim 16,
where comparing the initial identification information and the final identification information further comprises:
determining that the initial identification information does not match the final identification information; and
where the verification information indicates that the initial identification information does not match the final identification information.

* * * * *